(12) United States Patent
Cheng

(10) Patent No.: US 7,495,940 B2
(45) Date of Patent: Feb. 24, 2009

(54) METHOD AND DEVICE FOR PRODUCING RECTIFIER GATING SIGNALS USING A PEAK DETECTOR

(75) Inventor: Louis Cheng, Ontario (CA)

(73) Assignee: Honeywell International Inc., Morristown, NJ (US)

(*) Notice: Subject to any disclaimer, the term of this patent is extended or adjusted under 35 U.S.C. 154(b) by 454 days.

(21) Appl. No.: 11/206,748

(22) Filed: Aug. 19, 2005

(65) Prior Publication Data

US 2007/0242490 A1     Oct. 18, 2007

(51) Int. Cl.
*H02M 5/42*    (2006.01)
*H02M 7/04*    (2006.01)
*H02M 7/757*   (2006.01)
*G05F 1/00*    (2006.01)

(52) U.S. Cl. ............... 363/84; 363/81; 363/85; 363/86; 363/87; 363/88; 363/89; 363/39; 363/44; 363/125; 363/127; 323/282

(58) Field of Classification Search ............ 363/81, 363/84–89, 39, 44, 125, 127; 323/282
See application file for complete search history.

(56) References Cited

U.S. PATENT DOCUMENTS

| 4,165,508 | A |   | 8/1979  | Barter |         |
|-----------|---|---|---------|--------|---------|
| 4,729,082 | A | * | 3/1988  | Sato   | 363/41  |
| 4,958,108 | A | * | 9/1990  | Jorgensen | 315/307 |
| 4,990,912 | A |   | 2/1991  | Selwa  |         |
| 5,485,393 | A |   | 1/1996  | Bradford |       |
| 5,825,319 | A |   | 10/1998 | Murden et al. |  |
| 5,969,545 | A |   | 10/1999 | Assadian et al. | |
| 6,064,238 | A |   | 5/2000  | Wight et al. |   |
| 6,188,250 | B1 |  | 2/2001  | Voorman et al. | |
| 6,208,173 | B1 |  | 3/2001  | Redman-White |  |
| 6,512,399 | B1 |  | 1/2003  | DeGeronimo et al. | |
| 6,836,156 | B2 |  | 12/2004 | Chien |          |

FOREIGN PATENT DOCUMENTS

| DE | 3047828 | 7/1982 |
| DE | 4327162 | 7/1994 |
| JP | 2000-156617 | 6/2000 |

* cited by examiner

*Primary Examiner*—Akm E Ullah
*Assistant Examiner*—Jue Zhang
(74) *Attorney, Agent, or Firm*—Oral Caglar, Esq.

(57) ABSTRACT

A device that includes an active rectifier (14) having control gates controllable to produce an output voltage on a DC bus (20), a gate control circuit (16) for producing gate control signals for controlling the active rectifier control gates, a first circuit (18) connected to the gate control circuit (16) and producing a command current magnitude signal and a power factor signal for use by the gate control circuit (16), a current line (30) providing a current related to the DC load current to the first circuit (16), and a voltage line (32) providing a voltage related to the DC bus voltage to the first circuit (16), the first circuit (16) including a peak detector (64) detecting current peaks on the DC bus (20), a command current magnitude signal generator (34) commanding a current as a function of the detected peaks, and a power factor controller (33, 40) varying the power factor signal (42) to control the voltage on the DC bus (20). Also a method of controlling voltage on a DC bus (20) based on peak current detected on the bus.

11 Claims, 9 Drawing Sheets

METHOD AND DEVICE FOR PRODUCING RECTIFIER GATING SIGNALS USING A PEAK DETECTOR

STATEMENT OF GOVERNMENT INTEREST

This invention was made with Government support under Contract No. N00019-02-3002 awarded by Department of the Navy. The Government may have certain rights in this invention.

FIELD OF THE INVENTION

The present invention is directed toward a method and device for providing a command current signal to an active rectifier producing an output on a DC bus, and, more specifically, toward a method and device for providing a command current signal to an active rectifier that uses current feedback from the DC bus to regulate bus voltage in the presence of current fluctuations on the DC bus.

BACKGROUND OF THE INVENTION

Active rectifiers produce DC power having desired current and voltage characteristics from an AC source. It is known to circulate a variable current proportional to a load current on the DC bus to the active rectifier and to control voltage on the DC bus by adjusting a power factor input to the active rectifier as the DC load current varies. However, it is has been found that certain types of equipment, such as a switched reluctance machine for starting a main aircraft engine, can produce a large amount of current harmonics and may cause oscillations on the DC bus.

Known controllers cannot adequately control DC bus voltage in the presence of such current fluctuations unless the level of recirculating current is increased significantly. Such an increase in recirculating current will lead to higher power losses and require a larger, heavier device. Increasing the power output and weight of the device is particularly undesirable in the aircraft systems where such switched reluctance machines may be found, especially in view of the fact that these current oscillations are generally transient in nature. It is especially undesirable to provide a heavier, more costly system merely to address such transient conditions.

SUMMARY OF THE INVENTION

These problems and others are addressed by the present invention, which comprises, in a first aspect, a method of controlling a voltage on a DC bus using an active rectifier having a DC bus voltage input and a DC bus current input. A signal related to the DC bus voltage is provided to the DC bus voltage input, and a signal related to the DC bus current is provided to the DC bus current input. Current peaks are detected on the DC bus, and the active rectifier is commanded to produce a current on the DC bus that is a function of the detected current peaks. Voltage on the bus is controlled by varying a power factor signal sent to the active rectifier.

Another aspect of the invention comprises a device that includes an active rectifier having control gates controllable to produce an output voltage on a DC bus and a gate control circuit for producing gate control signals for controlling the active rectifier control gates. A first circuit is connected to the gate control circuit and produces a command current magnitude signal and a power factor signal for use by the gate control circuit. A current line provides a signal related to the DC load current to the first circuit, and a voltage line provides a signal related to the DC bus voltage to the first circuit. The first circuit includes a peak detector detecting current peaks on the DC bus, a command current magnitude signal generator commanding a current as a function of the detected peaks, and a power factor controller varying the power factor signal to control the voltage on the DC bus.

An additional aspect of the invention comprises a method of controlling a voltage on a DC bus comprising the steps of detecting current peaks on the DC bus, commanding an active rectifier to produce a current on the DC bus as a function of the detected current peaks, and varying a power factor signal sent to the active rectifier to keep the voltage on the DC bus substantially constant.

BRIEF DESCRIPTION OF THE DRAWINGS

These aspects and others of the present invention will be better understood after a reading of the following detailed description of an embodiment of the present invention together with the following drawings, wherein.

DETAILED DESCRIPTION

Figure 1:
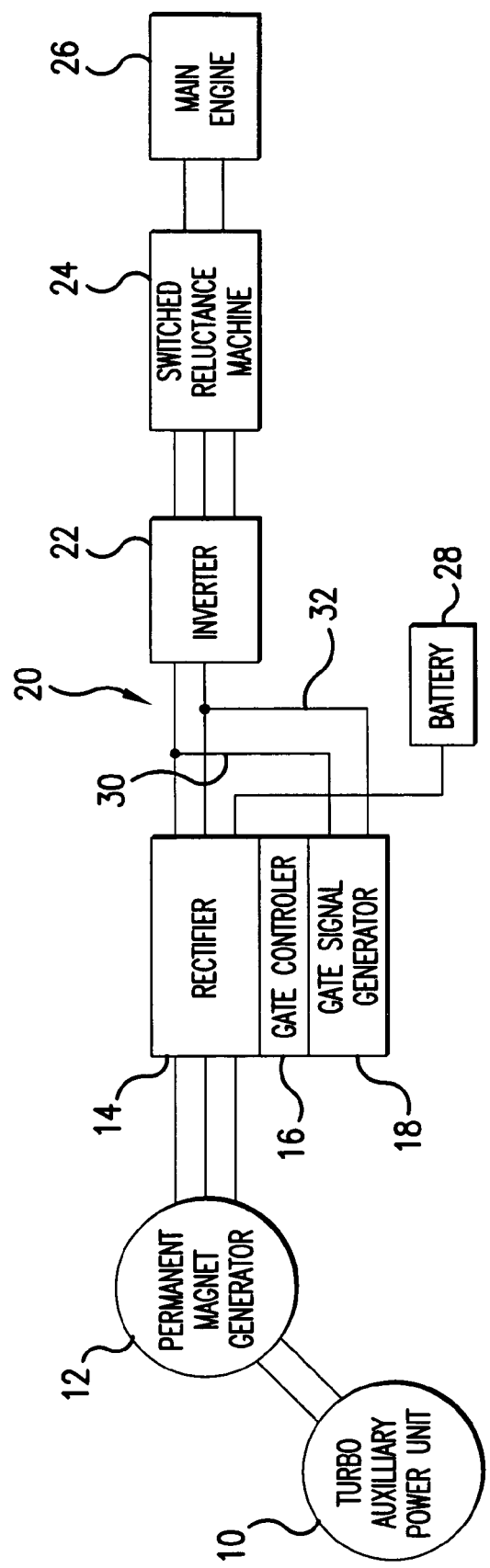
FIG. 1 schematically illustrates a portion of an aircraft power system that includes a rectifier having a gate controller and gate signal generator providing power to a DC bus.

Referring now to the drawings, wherein the showings are for the purpose of illustrating a preferred embodiment of the invention only, and not for the purpose of limiting same, FIG. 1 illustrates a portion of an aircraft engine starting system that includes a turbo auxiliary power unit 10, a permanent magnet generator 12, an active rectifier 14 including a gate controller 16 and a gate signal generator 18, a DC bus 20 connected to the output of rectifier 14, an inverter 22 on the DC bus 20, a switched reluctance machine 24 receiving an AC output from inverter 22, an aircraft main engine 26 and a battery 28. Current input line 30 connects DC bus 20 to gate signal generator 18; voltage input line 32 connects DC bus 20 to gate signal generator 18. At engine startup, battery 28 provides a power to permanent magnet generator 12 which starts turbo auxiliary power unit 10. When turbo auxiliary power unit 10 is operational, it drives permanent magnet generator 12 which provides three-phase AC power to rectifier 14. Rectifier 14 is controlled by gate signal generator 18 and gate controller 16 to produce DC power on DC bus 20. Inverter 22 provides AC power to switched reluctance machine 24 which provides power to start main engine 26.

Figure 2:
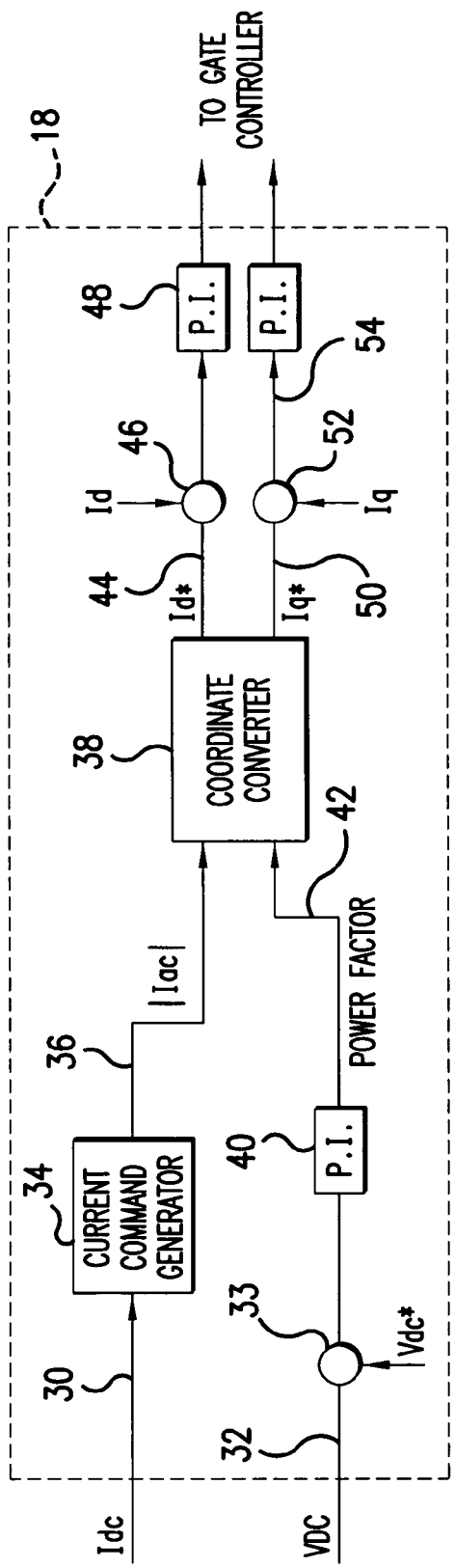
FIG. 2 schematically illustrates the gate signal generator of FIG. 1 receiving bus current, bus voltage and commanded bus voltage as inputs and providing as outputs real and imaginary current signals for use by the gate controller.

FIG. 2 illustrates gate signal generator 18 in greater detail. Gate signal generator 18 includes a command current generator 34 receiving as input the current $I_{dc}$ on DC bus 20 via current input line 30 and produces a command current signal on line 36. Command current signal, conventionally, has been equal to $I_{dc}$ multiplied by a constant on the order of, for example, 1.6, and this approach is provides adequate results in situations where current oscillations are not produced on the DC bus. Line 36 provides the command current signal to a coordinate converter 38. Meanwhile, $V_{dc}$ on line 32 is compared to a commanded DC bus voltage $V_{dc}^*$ by comparator 33, and this difference is passed, via proportional integral control loop 40 to coordinate converter 38 via line 42 as an indication of power factor. Based on the input command current on line 36 and power factor on line 42, coordinate converter 38 produces an output command for real current $(I_d^*)$ on line 44 and this command compared with the actual real current at comparator 46 and the difference is passed through a PI control loop 48 to gate controller 16. Coordinate converter 38 also produces an output command for imaginary current $(I_q^*)$ on line 50 which is compared with the actual value for imaginary current at comparator 52 and the difference is passed through a PI control loop 54 to gate controller 16. Gate controller 16 controls the rectifier gates in order to produce power on DC bus 20 having the commanded current and phase angle as the sensed voltage and current on the DC bus 20 vary.

Figure 3:
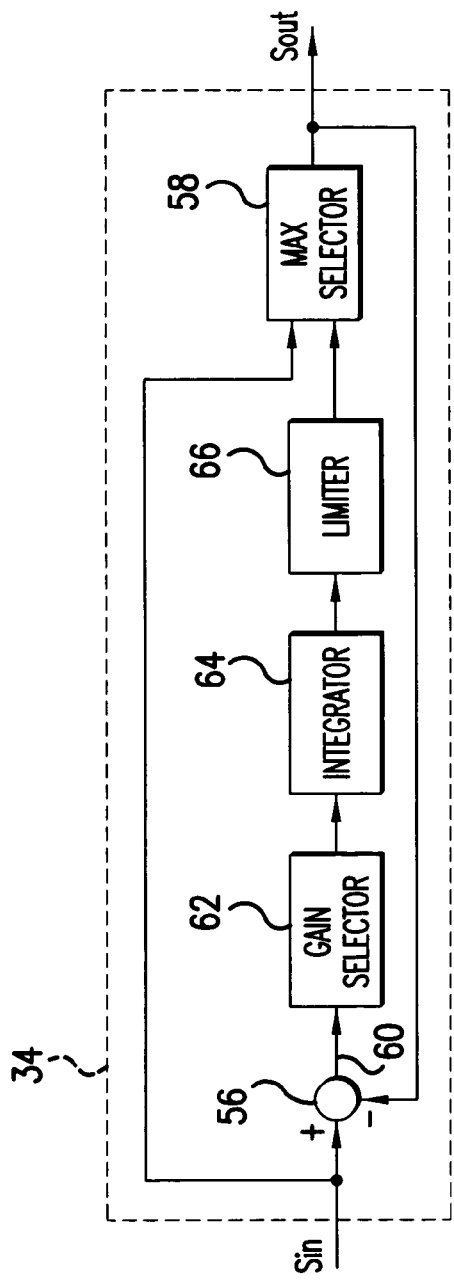
FIG. 3 is a block diagram illustrating the current command circuit of FIG. 3.

Command current generator 34 is illustrated schematically in FIG. 3. While command current generator 34 could be realized with hardware, it is presently preferred that the command current signal on line 36 be generated using software control. Command current generator 34 comprises a comparator 56 into which the current $I_{dc}$ on the DC bus is input which current is compared with the output of a max selector circuit 58. The difference between these inputs is provided on a line 60 to a gain selector 62 which, as will be described hereafter in connection with FIG. 5, applies a first gain to the signal on line 60 when the output of comparator 62 is positive and a second gain to the signal on line 60 when the output of comparator 62 is negative. The output of gain selector circuit 62 is integrated by integrator 64, passed through a limiter 66 and compared at max selector circuit 58 with the signal input on line 30, the actual current on DC bus 20, and the larger of the inputs to the max selector 58 is output on line 36 as the commanded current.

Figure 4:
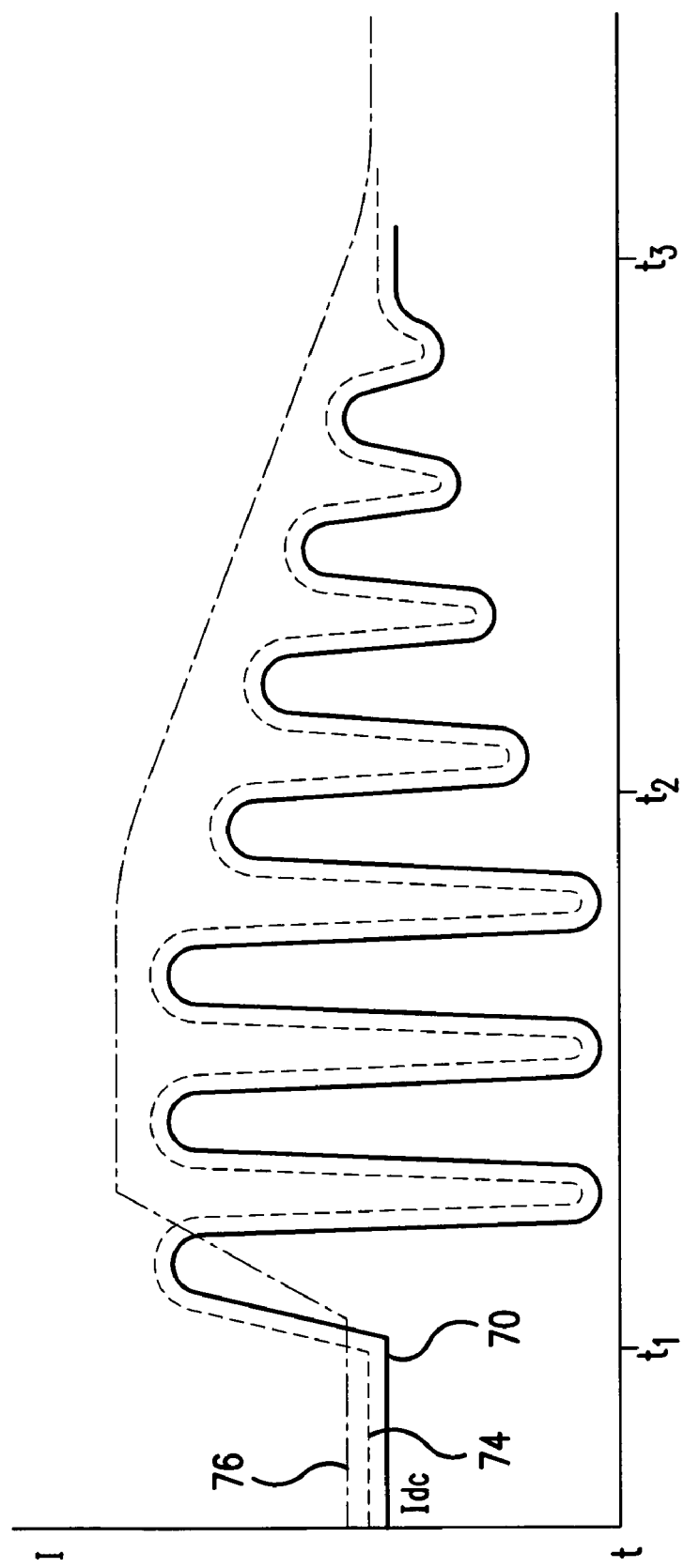
FIG. 4 is a waveform illustrating current levels commanded by the command current circuit of FIG. 3 and command current levels commanded by a conventional command current circuit as a current on the DC bus oscillates.
Figure 6A:
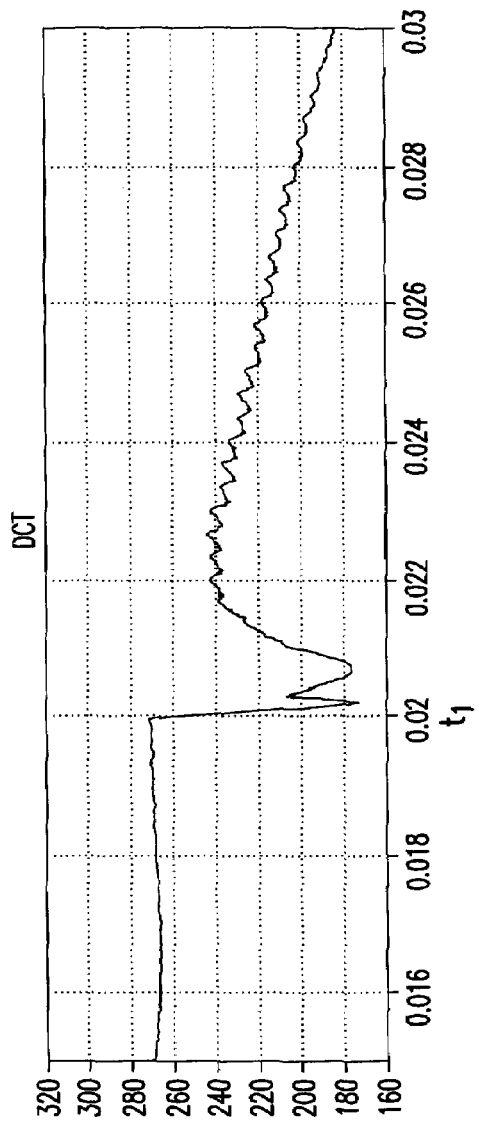
FIG. 6A illustrates simulated voltage levels that would occur on a DC bus during a main engine start using a conventional gate signal generator.
Figure 6B:
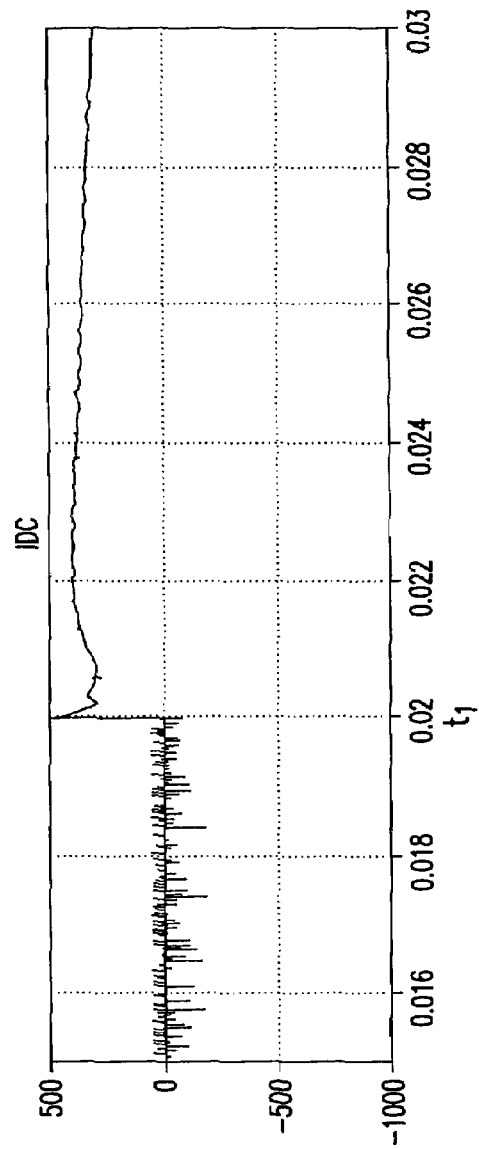
FIG. 6B illustrates simulated current levels that would occur on a DC bus during a main engine start using a conventional gate signal generator.

FIG. 4 schematically illustrates currents produced at different times be a conventional system and by command current generator 34. Solid line 70 represents sensed DC bus current. At time $t_1$, switched reluctance machine 24 connected to the DC bus begins to draw power from the DC bus and causes current oscillations 72 on the bus. These oscillations begin to decrease in amplitude at time $t_2$ and essentially disappear at time $t_3$. Dashed line 74 represents the current command $|I_{ac}|$ commanded by a conventional current command generator. This conventional current command tracks the current oscillations on the DC bus. However, it is difficult for a controller to vary the power factor in the face of these current fluctuations and maintain a desired voltage on the DC bus. As illustrated in the simulation of FIG. 6A, when the current oscillations begin at time $t_1$, voltage on bus 20 drops from a starting level of about 270 V to about 180 V, partially recovers to about 240 V and then gradually fades. FIG. 6B simulates the current on the DC bus during this time.

With reference to FIG. 4, chain dashed line 76 represents the current command provided by the current command generator 34 of an embodiment of the present invention. When an oscillation is detected, the current command is rapidly increased to a level that is a function of the detected peak value and substantially maintained at this value as additional peaks are detected. This allows the system to provide proper voltage on the DC bus during current fluctuations and meet transient requirements. At time $t_2$, the detected peaks begin to decrease in magnitude, and at that time the commanded current is caused to decrease as well, however, at a more gradual rate than the initial increase until time $t_3$ when the peaks have substantially disappeared.

Figure 7A:
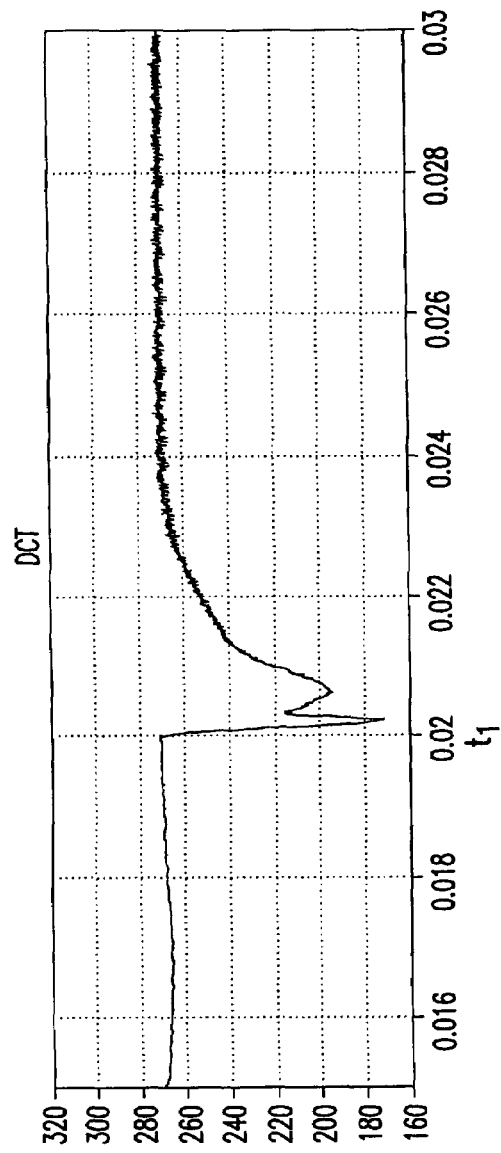
FIG. 7A illustrates simulated voltage levels that would occur on a DC bus during a main engine start using the gate signal generator of an embodiment of the present invention.
Figure 7B:
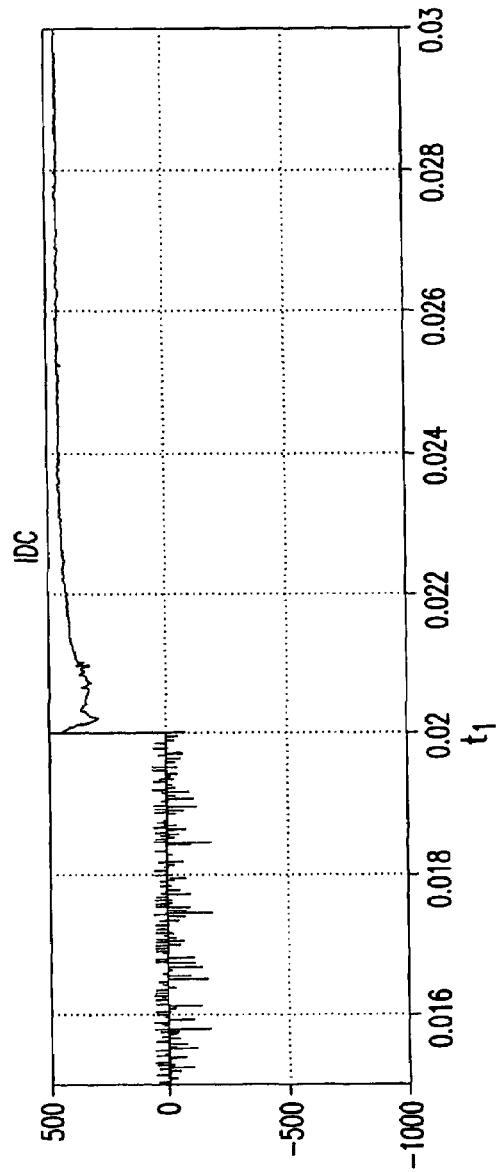
FIG. 7B illustrates simulated current levels that would occur on a DC bus during a main engine start using the gate signal generator of an embodiment of the present invention.

FIGS. 7A and 7B illustrate simulated test results using the current command generator of an embodiment of the present invention. In FIG. 7A, it can be seen that DC bus voltage drops at time $t_1$ from about 270 V to below 180 V when the switched reluctance machine begins to operate. However, within about 2.5 msec, this voltage level has returned to 270 V and is maintained at this level despite the current fluctuations. FIG. 7B illustrates a simulation of current on the bus over the same time period.

Figure 8A:
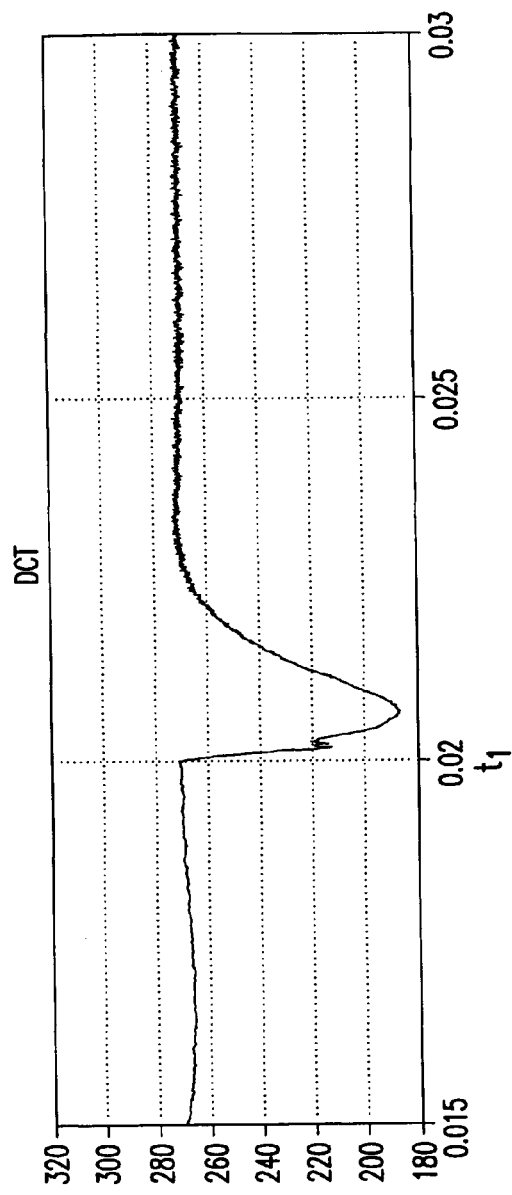
FIG. 8A illustrates simulated voltage levels that would occur on a DC bus during a transient condition from 0 kW to 100 kW using a conventional gate signal generator.
Figure 8B:
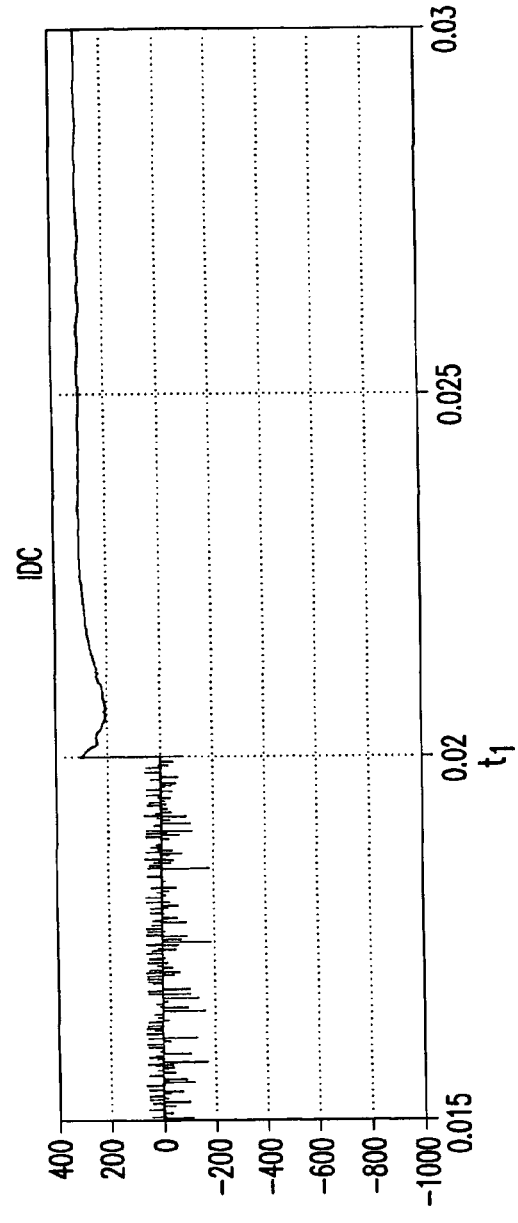
FIG. 8B illustrates simulated current levels that would occur on a DC bus during a transient condition from 0 kW to 100 kW using a conventional gate signal generator.
Figure 9A:
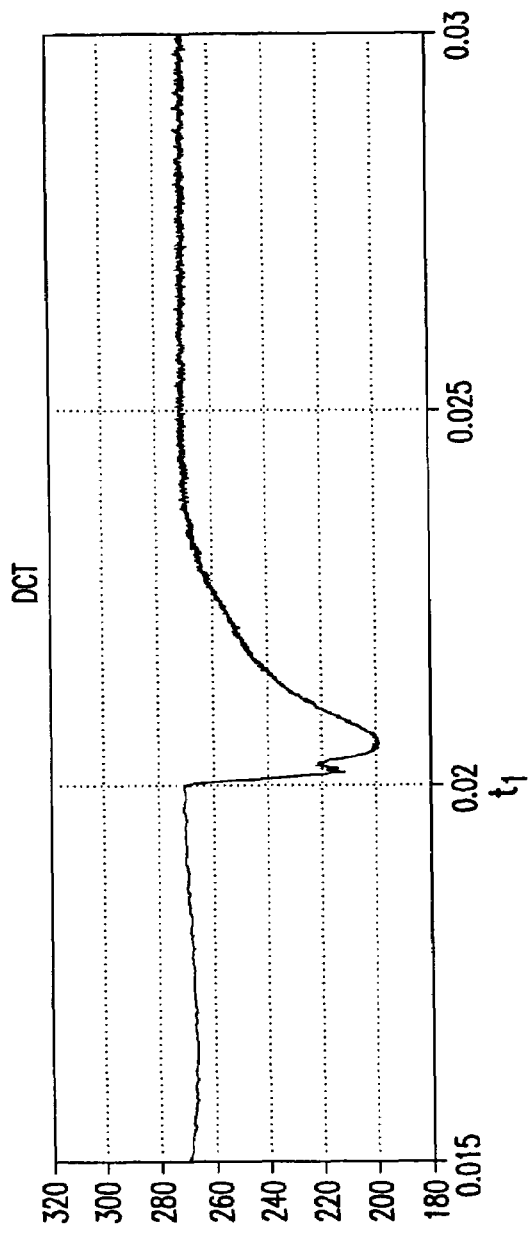
FIG. 9A illustrates simulated voltage levels that would occur on a DC bus during a transient condition from 0 kW to 100 kW using the gate signal generator of an embodiment of the present invention.
Figure 9B:
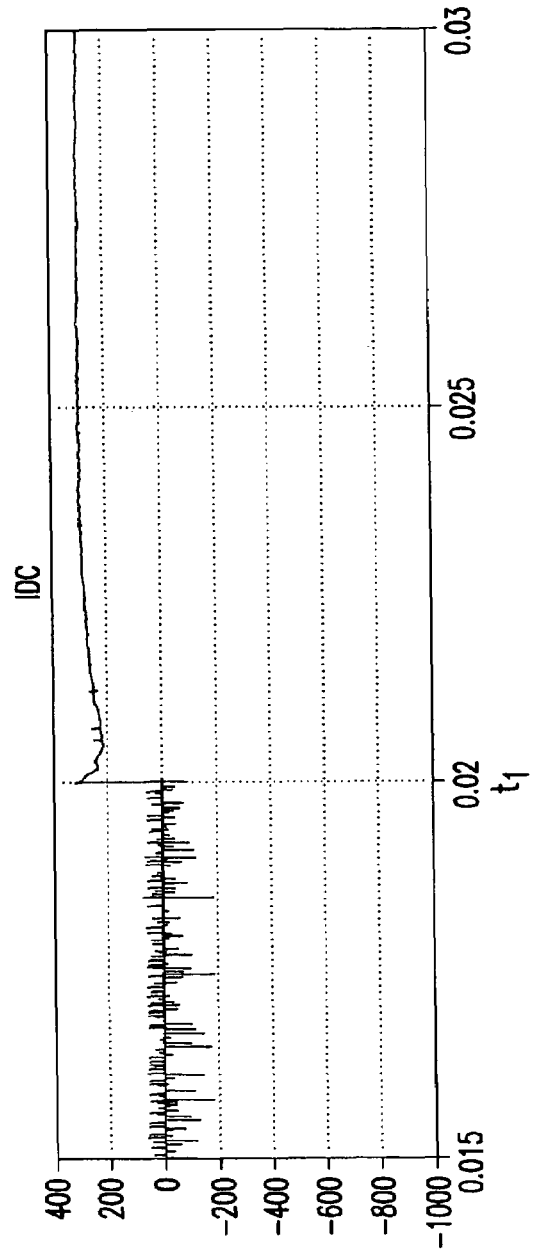
FIG. 9B illustrates simulated current levels that would occur on a DC bus during a transient condition from 0 kW to 100 kW using the gate signal generator of an embodiment of the present invention.

FIG. 8A illustrates a simulated transient condition when power drawn from the bus rises from 0 kW to 100 kW. The graph in FIG. 8A shows that under this condition, voltage will drop from 270 V to less than 190 V before recovering to initial levels. FIG. 8B illustrates a simulation of current on the bus over the same time period. FIG. 9A illustrates that, when the current command generator of an embodiment of the present invention is used, the voltage does not drop below about 200 V during this transient condition. FIG. 9B illustrates a simulation of current on the bus over the same time period. Thus the current command generator improves system operation under transient conditions as well.

Figure 5:
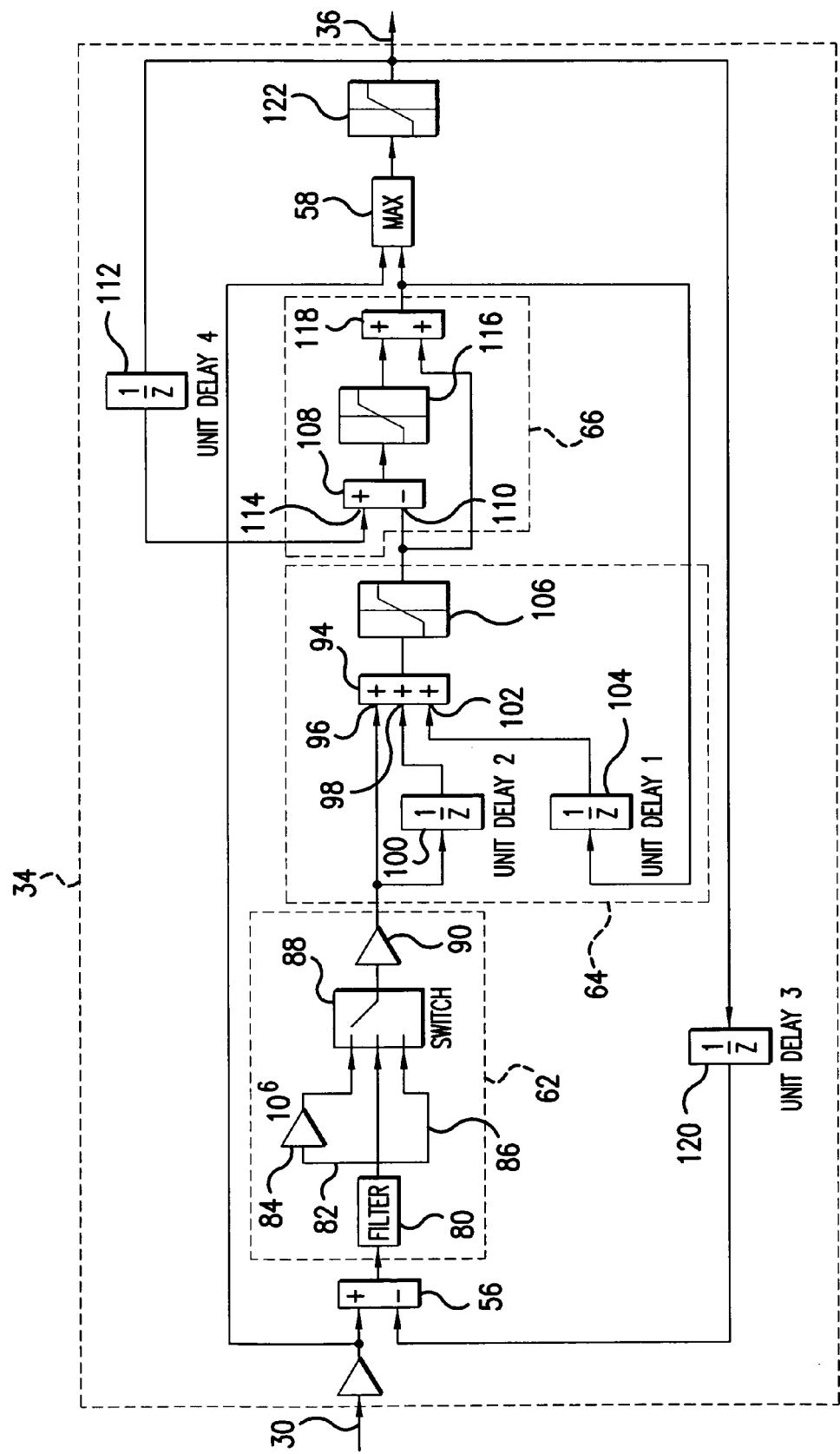
FIG. 5 is an embodiment of the current command circuit of FIG. 3.

Referring now to FIG. 5, an embodiment of current command generator 34, which includes comparator 56, gain selector 62, integrator 64 and limiter 66 of FIG. 3 is illustrated in detail. Specifically, gain selector 62 includes a deadband filter 80 for removing noise from the incoming signal, a first high gain pathway 82 including an amplifier 84 with a gain of, for example, one million, and a second pathway 86 having a gain of 1. Switch 88 determines which of the first and second pathways is connected to amplifier 90 and output to integrator 64. Current command generator 34 functions as a peak detector.

The output from amplifier 90 is sent to integrator 64, specifically to the first input 96 of a three input summer 94. The second input 98 of the summer 94 receives the same signal input to first input 96 after this signal has passed through unit delay 100. The third input 102 of summer 94 is the signal output from command current generator 34 delayed by unit delay 104. The sum of these values is integrated by integrator 106 and output to limiter 66.

Limiter 66 includes a differential amplifier 108 that receives the output of integrator 64 at its inverting input 110 and the signal output from command current generator 34, delayed by unit delay 112, at non-inverting input 114. The difference between these signals is integrated by integrator 116 and input to one input of a two-input summer 118, the second input of summer 118 receiving the output of integrator 64 directly. The output of summer 118 is output from limiter 66 and input both to maximum detector 58 and, via a unit delay 120, to the inverting input of differential amplifier 56. The second input of maximum detector 58 receives the signal from line 30 input to command current generator 34 and outputs the larger of these values to integrator 122, the output of which is output as the commanded current.

Figure 10:
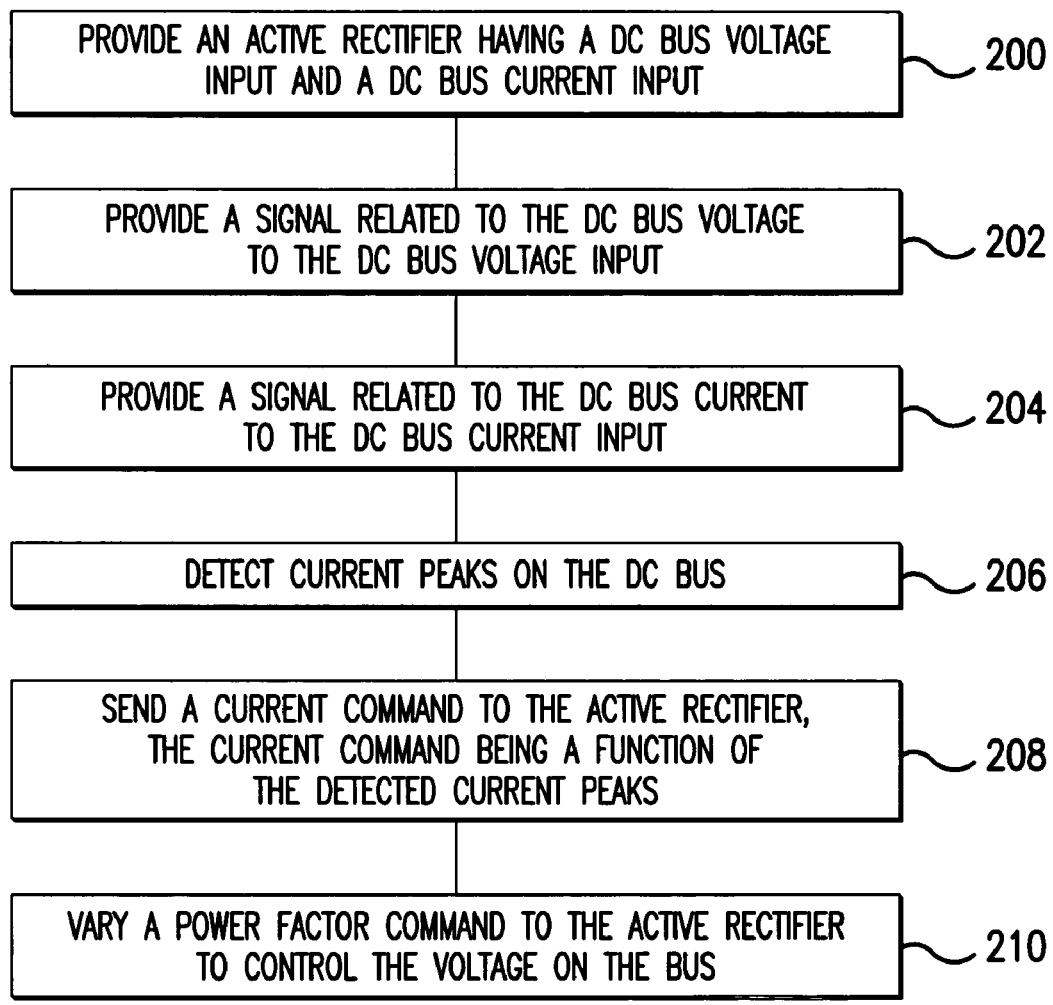
FIG. 10 illustrates a method of controlling a voltage according to an embodiment of the present invention.

FIG. 10 illustrates a method of controlling a voltage on a DC bus according to an embodiment of the present invention. An active rectifier having a DC bus voltage input and a DC bus current input is provided at a step 200, a signal related to the DC bus voltage is provided to the DC bus voltage input at a step 202 and a signal related to the DC bus current is provided to the DC bus current input at a step 204. Current peaks on the DC bus are detected at a step 206. A current command is sent to the active rectifier, the command being a function of the detected current peaks at a step 208 and a power factor command to the active rectifier is varied at a step 210 to control the voltage on the bus.

The present invention has been described herein in terms of various embodiments. Modifications and additions to these embodiments will become apparent to those of ordinary skill in the art upon a reading of the foregoing description. It is intended that the present application include all such obvious additions and modifications that fall within the scope of the several claims appended hereto.

I claim:

1. A method of controlling a voltage on a DC bus comprising the steps of:
   providing an active rectifier having a DC bus voltage input and a DC bus current input;
   providing a signal related to the DC bus voltage to the DC bus voltage input;
   providing a signal related to the DC bus current to the DC bus current input;
   detecting current peaks on the DC bus;
   sending a current command to the active rectifier, the current command being a function of the detected current peaks, said function having a first slope when the current command is less than a detected current peak and a second slope when the current command is greater than a detected current peak; and
   varying a power factor command to the active rectifier to control the voltage on the bus.

2. The method of claim 1 wherein said step of sending a current command to the active rectifier comprises sending a constant current command to the active rectifier.

3. The method of claim 1 wherein said function is independent of a current level between the detected current peaks.

4. The method of claim 1 wherein the magnitude of said first slope is greater than the magnitude of said second slope.

5. The method of claim 1 wherein said step of sending a current command to the active rectifier comprises the step of rapidly increasing the current command when the current command is less than a detected peak and gradually decreasing the current command when the current command is greater than a detected peak.

6. The method of claim 1 wherein said step of varying a power factor command to the active rectifier includes the additional step of comparing the signal related to the DC bus voltage to a reference signal.

7. A device comprising:
   an active rectifier having control gates controllable to produce an output voltage on a DC bus;
   a gate control circuit for producing gate control signals for controlling the active rectifier control gates;
   a first circuit connected to the gate control circuit and producing a command current magnitude signal and a variable power factor signal for use by the gate control circuit;
   a current line providing a signal related to the DC load current to the first circuit;
   a voltage line providing a signal related to the DC bus voltage to the first circuit;
   said first circuit including a peak detector detecting current peaks on the DC bus, a command current magnitude signal generator commanding a current as a function of the detected peaks, and a controller to control the voltage on the DC bus as a function of the variable power factor signal; and
   a selective pain controller for applying a first gain to the commanded current when the DC load current is greater than the command current and for applying a second gain to the commanded current when the DC load current is less than the commanded current.

8. The device of claim 7 wherein said first circuit includes an integrator and a limiter.

9. The device of claim 7 including an output signal comparator comparing the command current signal to the detected current signal and outputting the greater of the two signals.

10. The device of claim 8 wherein said first gain is about one million and said second gain is about one.

11. A method of controlling a voltage on a DC bus comprising the steps of:
   detecting current peaks on the DC bus;
   commanding an active rectifier to produce a current on the DC bus as a function of the detected current peaks;
   detecting a variable power factor;
   producing a varying power factor signal representative of the variable power factor;
   sending the varying power factor signal to the active rectifier; and
   varying the power factor signal to keep the voltage on the DC bus substantially constant,
   wherein the step of sending the varying power factor signal to the active rectifier comprises rapidly varying the power factor signal in a first direction when a command current is less than a detected peak dc bus current and rapidly varying power factor signal in a second direction when a command current is greater than detected peak dc bus current.

* * * * *